United States Patent [19]
Fidelibus, Jr. et al.

[11] Patent Number: 5,931,906
[45] Date of Patent: Aug. 3, 1999

[54] SYSTEM FOR CREATING A MULTIMEDIA PRESENTATION BY INTEGRATING LOCAL PROGRAM MATERIALS WITH REMOTELY ACCESSIBLE PROGRAM MATERIALS

[75] Inventors: Alexander James Fidelibus, Jr.; Nigel Harry Emil Hendrickson; Kevin Kohl Marth; Daniel Charles Stechow, all of New York, N.Y.

[73] Assignee: Creative Communications Group, New York, N.Y.

[21] Appl. No.: 08/845,047

[22] Filed: Apr. 18, 1997

[51] Int. Cl.$^6$ ................................ G06F 13/00; G06F 9/44
[52] U.S. Cl. .................... 709/217; 709/203; 709/219; 709/227; 709/229; 707/9; 707/10
[58] Field of Search ........................... 395/200.3, 200.33, 395/200.47, 200.48, 200.49, 200.57, 200.58, 200.59, 681; 707/1, 4, 9–10, 500–501; 348/7–8, 12–13; 360/13; 345/28; 709/200, 203, 217–219, 227–229

[56] References Cited

U.S. PATENT DOCUMENTS

| | | | |
|---|---|---|---|
| 5,612,730 | 3/1997 | Lewis | 348/8 |
| 5,617,565 | 4/1997 | Augenbraun et al. | 707/4 |
| 5,636,073 | 6/1997 | Yamamoto et al. | 360/13 |
| 5,668,996 | 9/1997 | Radinsky | 395/681 |
| 5,732,216 | 3/1998 | Logan et al. | 395/200.33 |
| 5,740,384 | 4/1998 | Asthana et al. | 395/200.73 |

*Primary Examiner*—Zarni Maung
*Assistant Examiner*—Bharat Barot
*Attorney, Agent, or Firm*—Duft, Graziano & Forest, P.C.

[57] ABSTRACT

The interactive multimedia system supplies the necessary computer program intelligence and user interface for a remote computing device to communicate with a user's local computing device over a public communication network connection. The interactive multimedia entertainment system executes on the remote computing device and allows a user to interactively define and execute a multimedia task on the remote computing device by way of the public communication network. The user mounts a single purpose recorded medium in a media drive located in the local computing device and the interactive multimedia entertainment system incorporates the audio and/or visual components contained on the recorded medium with audio and/or visual components stored on the remote computing device by the interactive multimedia system to create a multimedia presentation. The user's single purpose recorded medium is therefore enhanced to create a user defined multimedia presentation. A music listener's experience can therefore be enhanced via the Internet by adding a visual component to a particular song or group of songs on a specific audio CD.

18 Claims, 4 Drawing Sheets

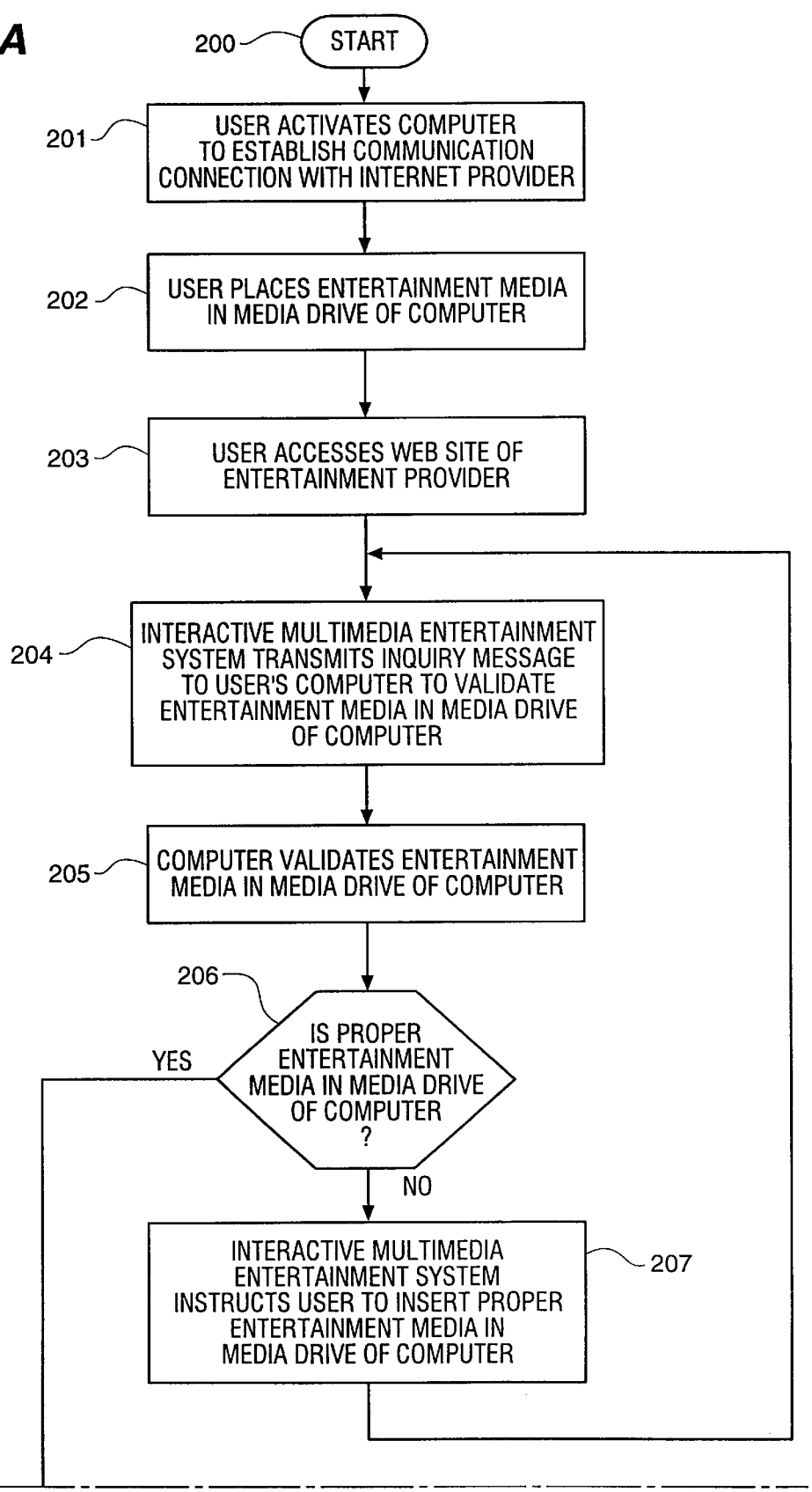

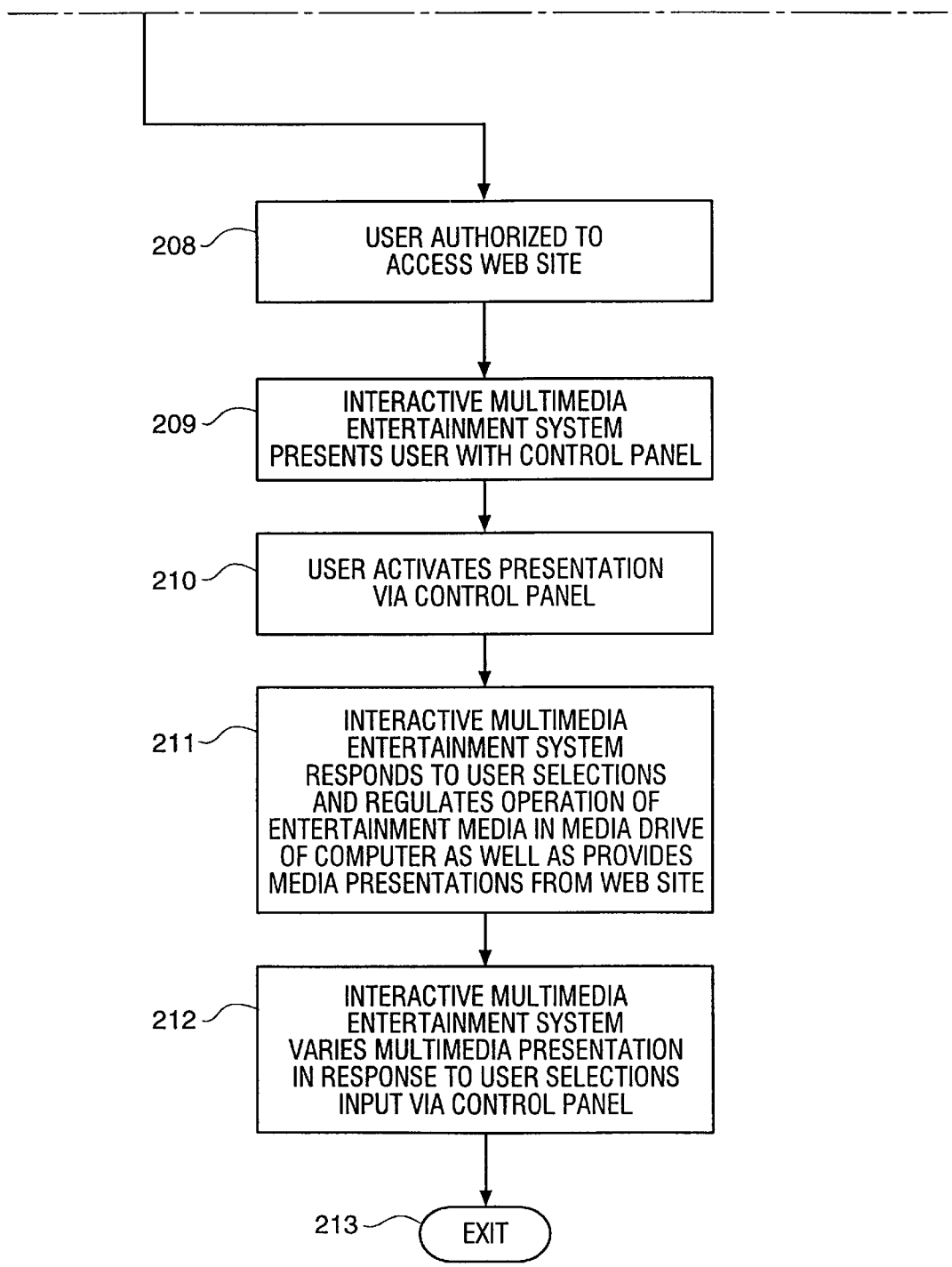

SYSTEM FOR CREATING A MULTIMEDIA PRESENTATION BY INTEGRATING LOCAL PROGRAM MATERIALS WITH REMOTELY ACCESSIBLE PROGRAM MATERIALS

FIELD OF THE INVENTION

This invention relates to the field of multimedia systems and, in particular, to an interactive multimedia system comprised of a user controlled visual component that is remotely accessed by way of a public communication network, and a single purpose prepackaged audio component that is not itself a complete multimedia medium.

PROBLEM

Audio recording technology has evolved over many decades in popular mediums that include, but are not limited to, vinyl Long Playing (LP) recordings and more recently Redbook format Compact Disk (CD) recordings. Among the factors driving the advancements in audio recording technology for these mediums are reduced size, and the increased storage capacity, reliability, and quality of reproduced sound. Future technological advances will no doubt further each of these factors. Nevertheless, one factor that has remained constant throughout the audio recording technology field is that the audio medium is a single purpose medium that requires at least a single purpose playback device for a user to experience the recorded audio.

One technology that is often combined with recorded audio is recorded visual programming. For example, in the popular music business one prominent pioneer of combined audio and visual multimedia presentation is the Music Television (MTV) format where the audio of a popular musical number is combined with a choreographed visual component. However, one disadvantage of this type of multimedia audio and visual presentation is that the user or viewer has little control over the presentation beyond volume control, or on and off. Because the multimedia presentation is fixed, also known as pre-packaged or canned, once the presentation is created it remains the same replay after replay. Further, because the audio and visual presentation is pre-packaged, not all users or viewers are likely to enjoy all or part of the same presentation given the diversity individuals in a world wide audience.

Another disadvantage of combining a traditionally single purpose audio component with a prepackaged visual component is that only the single purpose audio component is commercially available, for example, in CD form. The combined audio and visual components are typically not commercially available for private on-demand use. If on-demand use is desired, the user or viewer must make a private recording of the multimedia presentation the next time an original of the presentation occurs. However, even if a private recording is made, the content of the private recording remains "canned" replay after replay. Although the original of the multimedia presentation can be updated, the updating is not done on-demand. Further, the updating is not done at the artistic direction of an individual user or viewer to precisely match the tastes of an individual user or viewer.

For these reasons alone, there is an ongoing need for an inexpensive and easy-to-use multimedia system that can generate an on-demand audio and visual multimedia presentation whose content can be manipulated by the user or viewer. A solution to this problem has heretofore not been known prior to the invention as disclosed and claimed below.

One recent advance in the use of PC technology is the ability for a PC user to access easily updatable material from a world wide network of computers known generally as the Internet. The Internet, also known as the World Wide Web (WWW) or the Web, includes a network of Servers that can each support at least one Web page from which a PC user can obtain multimedia audio and/or full motion user controlled interactive video material.

SOLUTION

The interactive multimedia system of the present invention solves the above stated problems by combining an interactive visual component controlled by a user at a Personal Computer (PC) with a traditional single purpose audio recording that is replayed on the PC. The single purpose audio recording is re-purposed for function not only as the audio component of a multimedia presentation, but as a security key to gain authorized access to the visual component of the multimedia presentation. The visual component and the computer program intelligence necessary for the interactive multimedia system is obtained by way of a remote computing device that is accessible by way of a public communication network connection. Re-purposing is the enhancing and/or redirecting of an existing technology from its original, primary, expected, or intended purpose, to a new, secondary, and/or unexpected purpose for which the technology was never intended.

The interactive multimedia system executes on the computing device that is remote from a user's local computing device, and allows the user to interactively define and execute a multimedia entertainment task on the remote computing device by way of a connection through the public communication network. The user mounts a recorded medium in a media drive located in the local computing device and the recorded medium is itself used as a security key to determine if access is granted or denied. If the recorded medium is not verifiable, then further access to the interactive multimedia system is denied. Alternatively, if the recorded medium is verifiable, then the interactive multimedia system incorporates the audio and/or visual components of the recorded medium with audio and/or visual components stored on the remote computing device to generate a multimedia presentation under the direct control of the user. The user's recorded medium is therefore enhanced to create a user defined and user directed multimedia presentation. For example, a music listener's experience can therefore be enhanced via the Internet by adding a visual element to a particular song or group of songs on a specific audio CD, which is played in the user terminal CD drive.

In a preferred embodiment, the user's recorded medium is a commercially available Redbook format audio CD. The CD is used to obtain the audio component of the multimedia presentation and a server of an Internet Web page is used to obtain the interactive visual component of the multimedia presentation. The visual component can include, but is not limited to, graphic animation, video, and/or textual program material. The user can therefore not only hear the audio component, but simultaneously receive visual data indicative of the audio component and/or the artists who perform the audio program material. Data indicative of the audio component can include, but is not limited to, song lyrics, artists' tour dates, recent photographs or video clips of the artists, artist profiles, advertising, contest information, prizes, games, and the like. Thus, the music listener's experience is enhanced by adding a real time and easily updatable visual component to an otherwise single purpose audio component.

The user's local computing device and the interactive multimedia system on the remote computing device server, communicate by standard protocols arid instructions that are well known and widely used by users of the public communication network. The user's local computing device includes a display terminal such as that which typically available with a PC. Communication over the public communication network is facilitated by either a remote communication device such as a MODulator DEModulator (MODEM) or any other shared or individual use network communication device.

BRIEF DESCRIPTION OF THE DRAWINGS

FIGS. 2A & 2B illustrate an overview of the operational steps of the interactive multimedia system in flow diagram form.

DETAILED DESCRIPTION

System Configuration

Figure 1:
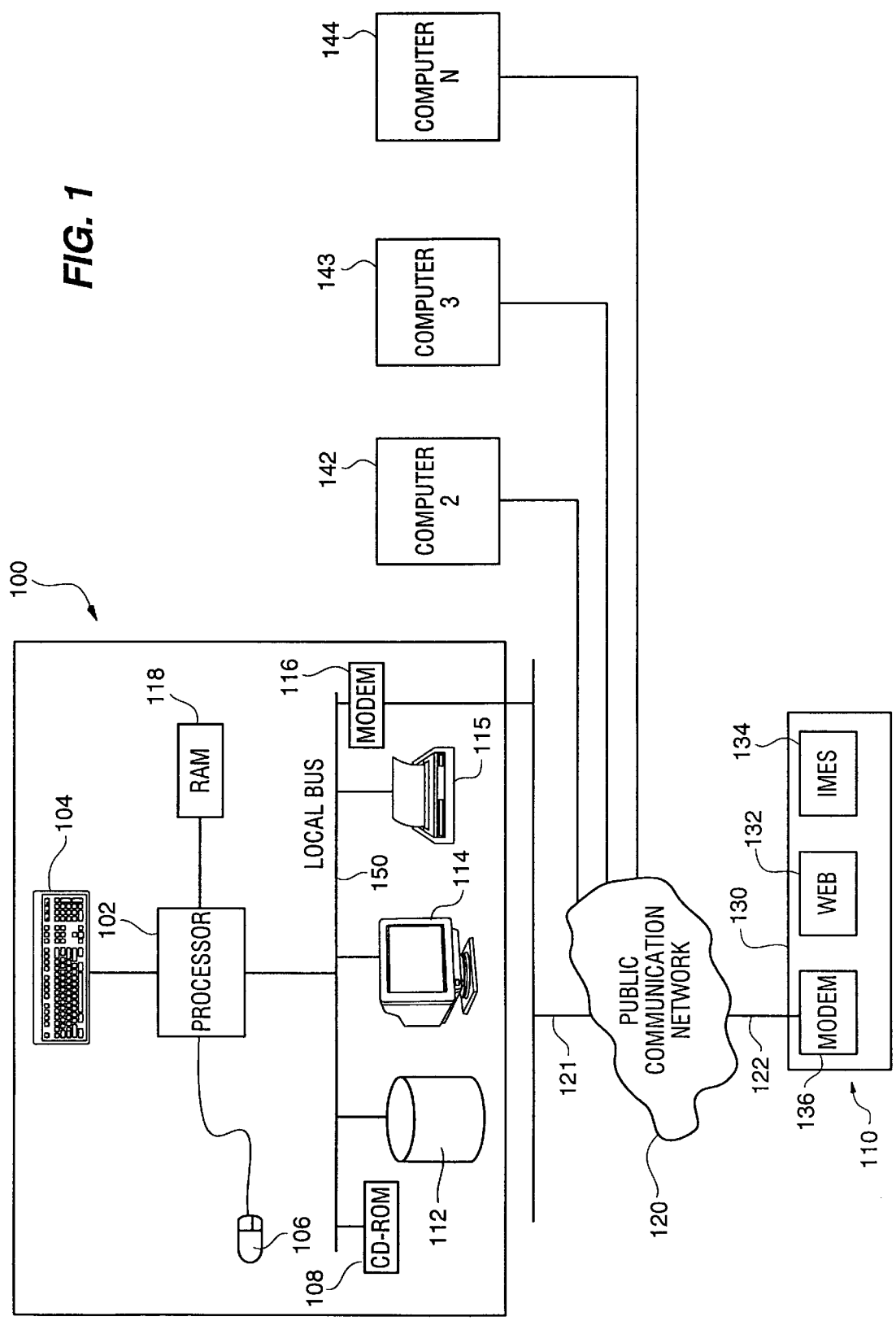
FIG. 1 illustrates an exemplary interactive multimedia system configuration in block diagram form.

FIG. 1 illustrates, in block diagram form, an example of a interactive multimedia system of the present invention. The particular interactive multimedia system configuration illustrated in FIG. 1 includes, but is not limited to: a remote computing device 110, a user's local computing device 100, and a public communication network 120 which serves to interconnect the remote computing device 110 and the local computing device 100. Other user computing devices 142–144 are also operatively connected to public communication network 120 and are also capable of accessing the remote computing device 110.

Local computing device 100 can be any computing device that supports computing essentials including, but not limited to, a processor 102, a writable memory 112, a media drive 108, a Random Access Memory (RAM) 118, a human readable output device 114, and a human user controlled input device 104, 106. A human readable output device 114 typically comprises an electronic display device, and human user controlled input devices 104 and 106. User controlled input devices 104 and 106 typically comprises a standard keyboard 104 and/or a screen display pointer device often referred to as a mouse 106. Additional output devices, such as printer 115 can optionally be included with the local computing device 100. A system bus 150 interconnects the processor 102 with the various components noted above. Examples of commonly available computing devices that can fill the role of local computing device 100 include, but are not limited to, a PC, a workstation, a multi-user computer, and a network computer.

Communication Network

One additional and essential feature of local computing device 100 is that it is configured with whatever minimum requirement of software and/or hardware that is necessary to access a remotely located computing device by way of the public communication network 120. Local computing device 100 is operatively connected to public communication network 120 by a MODEM 116 and communication link 121 that can be either a wire or wireless connection by any means well known and widely used in the communication industry. Public communication network 120 is any bidirectional network accessible to the general public from the local computing device 100 or any other computing device 142–144, which are devices widely available to the general consumer public and of the type noted above. Connectivity to public communication network 120 is also available by way of private server nodes often supported by private corporations, public and private educational institutions, not-for-profit organizations, government installations, or commercial for-profit service providers that are all well known and available in the industry. In one preferred embodiment, the public communication network 120 is commonly referred to as the Internet, also known or loosely referred to as the Net, the Information Super Highway, the World Wide Web, and the Web. The Internet for purposes of the present disclosure, is not to be confused with electronic mail, bulletin boards, or USENET news or discussion groups that often accompany but are not part of and are beyond the scope of the present invention.

The Internet, or the portion thereof that is relevant to the preferred embodiment of the present invention, is the network of computing devices or nodes, whether individually hardware and/or software compatible or not, that communicate or otherwise interact with each other by some combination of protocols and languages. Common Internet protocols and languages include but are not limited to, the Transmission Control Protocol/Internet Protocol (TCP/IP), the Telnet command and terminal emulator protocol, the HyperText Transfer Protocol (HTTP), the HyperText Markup Language (HTML) programming language of the Internet, and the Uniform Resource Locator (URL) protocol for identifying documents on the Internet. A URL document may also be loosely referred to by names including, but not limited to, Web page, Home page, Web site, Internet site, Web address, Location, and Link.

The generic software noted above that is necessary for user terminal 100 to access information from the Internet is commonly referred to as a browser or Web browser. A Web browser converts raw HTML coding into a graphical display on a computing device for viewing by a human user. A multitude of commercial Web browsers are readily available in the industry for virtually every computing device that is presently publicly available.

Remote Computing Device

The remote computing device 110 can be any computing device that supports computing essentials and comprises the elements substantially similar to those noted above with respect to the local computing device 100, including at least one MODEM 136 or other network communication device to enable the remote computing device 110 to be connected to the public communication network 120 and thereby be accessible to local computing device 100 or any other computing device 142–144. In addition, the remote computing device 110 comprises a server 130 which provides a multiprocessor capability to serve a plurality of communication connections to the user terminal which are connected to the remote computing device 110 via the public communication network 120 via communication link 122. Remote computing device 110, is therefore also known as an Internet Interface Device (IID), and has at least the same and typically more computing features and/or capabilities than the local computing device 100. In addition to the capabilities of local computing device 100, remote computing device 110 supports a publicly accessible Web site having a URL address in the preferred embodiment as generated by the Web interface generation software 132. The server 130 can support many features and services, with the interactive multimedia entertainment system 134 being just one of these features and services. The interactive multimedia entertainment system 134 typically comprises a program which is executable on server 130 in response to the user being validated by server 130. Included in server 130 is a plurality of sets of entertainment information, with each set of audio and/or visual information corresponding to a particular CD that the user can mount in CD-ROM media drive 108. A set of entertainment information typically comprises a number of multimedia segments which are designed to complement a selected entertainment element which is stored on the corresponding CD. These multimedia segments can be selected, controlled, and combined pursuant to commands received via a Web browser or other user interface. The integration of these multimedia segments by the interactive multimedia system 134 results in a multimedia presentation which is defined by the user and includes program materials retrieved from the local computing device 100, typically including audio and/or visual components from the CD mounted in CD-ROM drive 108. However, additional, user specific and/or user terminal specific data can be retrieved from local computing device 100 and integrated with the multimedia segments by the interactive multimedia system 134 to create a real time user-specific multimedia presentation.

Operation of Interactive Multimedia Entertainment System

FIGS. 2A & 2B illustrate an overview of the operation of interactive multimedia system in flow diagram form. The operational steps begin at step 200 and proceed to step 213 and represent one exemplary embodiment of the operation of interactive multimedia entertainment system, although variations of this process are considered as being within the capability of persons skilled in this art.

At step 200 a user activates a local computing device 100 that is capable of communicating with a remote computing device 110 by way of a public communication network 120 such as the Internet. In the preferred embodiment, the local computing device 100 is a PC or network computer that is configured with a Web Browser typically stored in memory 112, a MODEM 116 or other network communication device suitable for communicating on remote communication link 121, and sufficient memory and computing power to interact with another computing device 110 over the Internet 120. The advantage of communicating over the Internet 120 is that Web browser equipped computing devices are increasingly prevalent in the business community and in private homes. The result of this proliferation of Web Browser equipped computing devices is that a suitable remote computing device 110 can be easily located anywhere in the world. Once the user terminal is activated, at step 201, the user activates the local computing device 100 to establish a communication connection via the Internet 120 to the remote computing device 110 designated by the user, in well known fashion.

The user at step 202 places a recorded medium into the media drive 108 of the local computing device 100. This action can alternatively be performed by the user prior to establishing the communication connection to the remote computing device 110 or at a later time, in response to instructions received from remote computing device 110 as noted below. In any case, the recorded medium contains at least one, and typically a plurality, of sub-components that are recorded thereon in an organized manner. For example, the use of a CD-ROM media drive enables the user to mount a selected CD which contains a plurality of audio selections, recorded in tracks written on the CD. Each audio selection typically spans a plurality of physical tracks and is accessible independent of the other audio selections written on the CD. The CD also typically contains directory information recorded thereon, such as a sequential listing of the plurality of audio selections and an identification of the duration of each of the plurality of audio selections written on the CD.

As noted above, the user establishes a communication connection at step 201 from the local computing device 100 to the remote computing device 110 by way of public communication network 120. In the preferred embodiment, the communication connection is established by dialing or otherwise contacting an Internet Service Provider (ISP) or other private Internet service connection source that can provide connectivity to the Internet. Once Internet access is established, a request to communicate with the remote computing device 110 is made at step 203 by entering a URL command communicated with the HTTP protocol. A typical URL command uses syntax such as: "http://www.webpage.com" for example. The transmission of the URL command enables the user at local computing device 100 to access the Web site maintained by the Web server software extant on the remote computing device 110. The Web server of the remote computing device 110 transmits a standard Web page to the user terminal to initiate the remote interactive access of the interactive multimedia entertainment system which is running on remote computing device 110. The user views the Web page as presented on a display 114 of local computing device 100 and inputs data via mouse 106 or keyboard 104 to identify the particular function that the user wishes to access or otherwise manipulate. In particular, the user may identify that a multimedia presentation is desired and the user must then identify both the CD mounted in CD-ROM drive 108 and the desired one of the plurality of audio and/or visual component entertainment elements recorded thereon that the user wishes to have presented in multimedia format. This data input by the user is transmitted by local computing device 100 to the remote computing device 110 via the communication connection over the public communication network 120 using well known protocols and formats.

In response to the receipt of this data from the user selecting a multimedia presentation, identifying the recorded medium or CD, and the selected audio and/or visual component element, the interactive multimedia system is activated by the remote computing device 110. The interactive multimedia system validates the identity of the recorded medium that the user has placed in media drive 108. This is accomplished at step 204 by the interactive multimedia system transmitting an inquiry message via the public communication network 120 to the local computing device 100. The message instructs the local computing device 100 to scan the recorded medium placed in media drive 108 in well known fashion to identify or authenticate the recorded medium. This validation process is executed by the local computing device 100 at step 205 and can include identifying the recorded medium itself, and/or locating a particular segment such as a track or song, and/or determining the play time of all or a selected portion of the recorded medium. The result of the validation determination is communicated to the remote computing device 110 and the interactive multimedia system, at step 206, determines whether an authentic or validated or otherwise proper recorded medium is mounted in media drive 108. If the remote computing device 110 determines that the user either has not mounted any recorded medium at all or has mounted the wrong entertainment medium in the media drive 108, then processing proceeds to step 207. At step 207 the remote computing device 110 transmits a message to the local computing device 100 to communicate to the user that they must mount the proper recorded medium in the media drive 108. Alternatively, the local computing device 100 itself can be instructed to eject the CD mounted in the CD-ROM drive 108. Processing then returns to step 204 where processing continues as previously disclosed. If the recorded medium validation process is not successful after a predetermined number of attempts, processing terminates.

If it is determined at step 206 by remote computing device 110, that the proper recorded medium is mounted in media drive 108, processing advances to step 208 where the user is authorized to access the multimedia portion of the Web site extant on remote computing device 110. The remote computing device 110 transmits data at step 209 to the local computing device 100 representative of the Web page of the interactive multimedia system. Included in this Web page is a control panel which provides the user with a plurality of control options. At step 210, the user activates the multimedia presentation by operating one or more of the icons contained in the control panel. The icons can include the typical presentation control functions such as Play, Pause, Stop, and Eject, as well as multimedia control options that enable the user to regulate the particulars of a personal real time multimedia presentation. The particulars can include, but are not limited to, background color, speed of animation, text display, speed of scrolling, and the number and identity of multimedia elements concurrently displayed. Once the user activates a set of selections, the interactive multimedia system 134 at step 212 performs the audio and/or visual component integration function to produce the user customized multimedia presentation.

Figure 3:
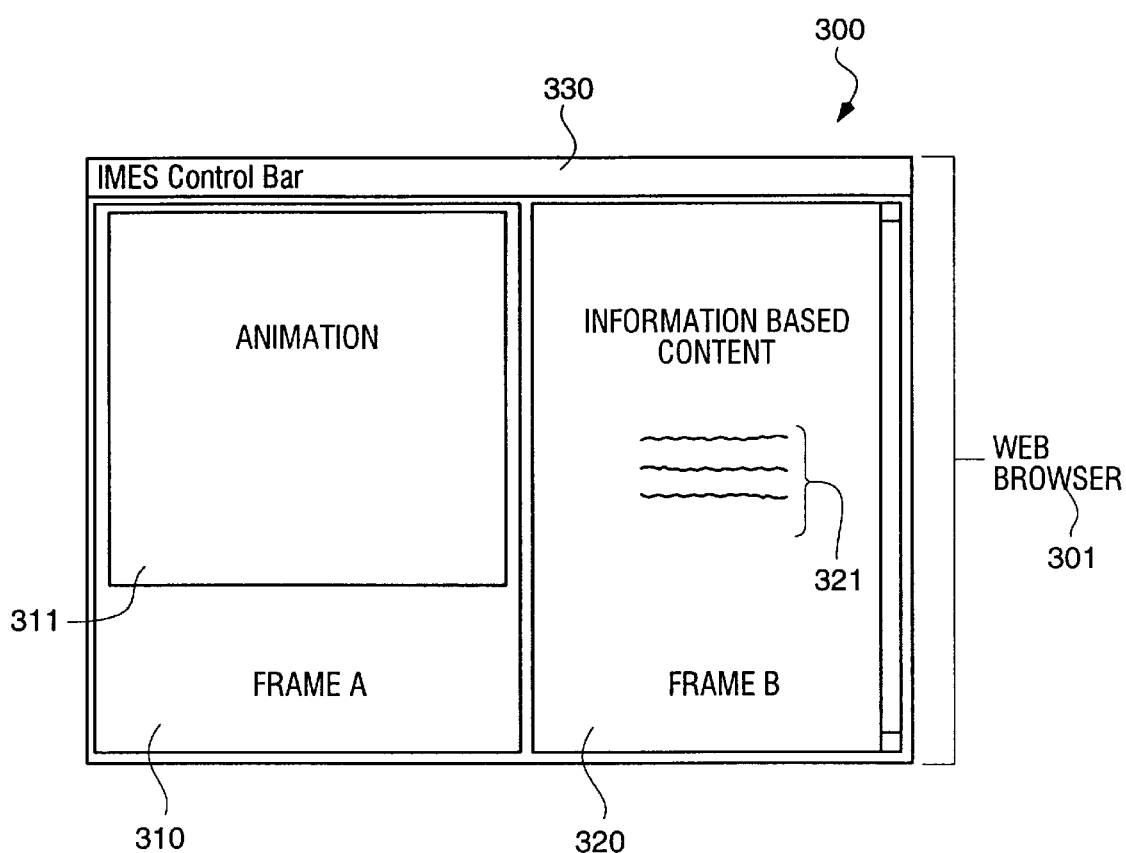
FIG. 3 illustrates an example of a screen display presentation format in block diagram form.

FIG. 3 illustrates an example of a block diagram screen display format 300 that a user of the interactive multimedia system 134 can view or a local display screen 114. The interactive multimedia entertainment system 134 can include two "frames" 310 and 320 of information in the Web site associated with the selected entertainment element. A first frame 310, Frame A, contains the interactive animation 311 or "movie" while a second frame 320, Frame B, contains information-based Web site content 321, such as textual data. When the user clicks on the Play icon, from the IMES control bar 330 for example, the animation 311 contained in the Frame A 310 is activated simultaneously with the audio from the CD-ROM which is mounted in the user terminal CD-ROM drive 108. The animation 311 becomes the visual enhancement for the music and can comprise still photographs, illustrations, text, Quick-Time movies and the like. The animation 311 is selected to complement the selected audio program material. In addition, there can be objects such as images and/or creative elements in the animation 311 that function as interactive buttons. When the user selects any one of these buttons, the user is empowered to interact with the visual image that is created by dynamically controlling at least one attribute of the visual image. For example, the user can control the visual parameters of the animation, such as color palette, speed, addition/subtraction of textures/patterns, or the user can link to Frame B 320, and alter the content 321 of Frame B 320. At this point, both Frame A 310 and Frame B 320 are available to the user so that the user can dynamically modify the presentation or control the operation of the multimedia presentation. The user can peruse the contents of each of these frames without effecting the other, such as reviewing the textual material 321 presented in Frame B 320 without effecting the animation 311 and audio portion of the presentation presented in Frame A 310. The Web page viewed via the user's web browser 301, displays information such as song lyrics, tour dates, recent photos, artist profiles, advertising, contests, prizes and the like. When the user clicks on the Pause icon from the IMES control bar 330, the animation 311 in Frame A 310 and the audio CD-ROM simultaneously pause. The text information 321 in Frame B 320 is not effected. When the user again clicks on the Play icon from the IMES controller 330, the animation 311 and audio simultaneously are activated and pick up where they left off. When the user clicks on the Stop icon, the animation 311 and audio stop simultaneously and new images appear in Frame A 310. These new images are links which control the contents 321 of Frame B 320. A new control bar 330 or other more robust control panel can be displayed to the user that can contain numbers that represent the different songs that are recorded on the CD that is mounted in CD-ROM drive 108. The user can continue to select a new entertainment selection and receive another multimedia presentation, or the user can select an entertainment selection that does not have an interactive multimedia presentation associated therewith. In the absence of interactive multimedia, the user receives an audio program without multimedia corresponding to the audio, so that the user is free to continue to "surf" other features of the Web site. If the user clicks on the Play icon, the animation and audio program material are reinitiated from the beginning. When the user clicks on the Eject icon at step 213, the animation and audio CD-ROM stop simultaneously and the CD is ejected from the CD-ROM drive 108. A message is displayed to the user in the animation window and the Web page is still functional for further user actions.

Summary

The interactive multimedia system supplies the necessary computer program intelligence and user interface for a remote computing device to communicate with a user's local computing device over a public communication network connection. The interactive multimedia system executes on the remote computing device and allows a user to interactively define and execute a multimedia entertainment task on the remote computing device by way of the public communication network. The user mounts an entertainment medium in a media drive located in the user terminal and the interactive multimedia entertainment system incorporates the entertainment elements contained on this entertainment medium with entertainment elements stored on the interactive multimedia entertainment system to create a multimedia presentation. The user's entertainment medium is therefore enhanced to create a user defined multimedia presentation. A music listener's experience can therefore be enhanced via the Internet by adding a visual element to a particular song or group of songs on a specific audio CD.

Although specific embodiments are disclosed herein, it is expected that persons skilled in the art can and will design alternative interactive multimedia type systems that are within the scope of the following claims either literally or under the Doctrine of Equivalents.

What is claimed is:

1. An interactive multimedia system for enabling a user at a local computing device, that is equipped with a media drive and a display device, to control an interactive multimedia presentation, said interactive multimedia system being located remote from said local computing device and comprising:

means, responsive to said local computing device establishing a connection to said interactive multimedia system via a communication medium, for verifying that said user of said local computing device has mounted a recorded medium in said media drive;

interface means for providing direct access to and from said communication medium for said local and remote computing devices;

means for enabling said user to select from a plurality of presentation options presented to said user via said local computing device;

server means for processing an audio component from said recorded medium pursuant to said user selected presentation options; and means for presenting a multimedia presentation on said display device of said local computing device, said multimedia presentation comprising a combination of said audio component and a visual component stored in memory in said interactive multimedia system in a manner defined by said user selecting from said plurality of presentation options.

2. An interactive multimedia system according to claim 1, wherein said communication medium comprises the Internet, said interactive multimedia system further comprises:

display generation means for presenting a Web page to a user connected to said interactive multimedia system via said interface means.

3. An interactive multimedia system according to claim 1 further comprising:

media storage means for storing data representative of at least one of said audio component and said visual component of said multimedia presentation.

4. An interactive multimedia system according to claim 3 wherein said means for presenting includes:

media processing means for integrating said audio component from said recorded medium with said visual component of said multimedia presentation from said media storage means pursuant to said user selected presentation options.

5. An interactive multimedia system according to claim 4 wherein said means for verifying includes:

means for transmitting control messages to said local computing device to activate said local computing device to retrieve data from said recorded medium; and means, responsive to receipt of said retrieved data from said local computing device, for determining whether said recorded medium is mounted in said media drive.

6. A method for providing an interactive multimedia service for enabling a user at a first computing device equipped with a CD-ROM drive and a display device, to control an interactive multimedia presentation generated by a second computing device located remote from said first computing device, said method comprising:

verifying, in response to said first computing device establishing a connection to said second computing device via a communication medium, that said user of said first computing device has mounted a CD in said CD-ROM drive;

enabling said user to select from a plurality of presentation options presented to said user via said first computing device;

processing multimedia information from said CD mounted in said CD-ROM drive pursuant to said user selected presentation options; and presenting a multimedia presentation on said display device of said first computing device, said multimedia presentation comprising a combination of said multimedia information from said CD and multimedia information from said second computing device in a manner defined by said user selecting from said plurality of presentation options.

7. A method according to claim 6 wherein said second computing device comprises a server for processing said multimedia information from said CD mounted in said CD-ROM drive pursuant to said user selected presentation options, an interface for providing direct access to and from said communication medium, and media storage for storing data representative of said multimedia information which comprises at least one multimedia presentation segment, said step of presenting comprises:

integrating said multimedia information from said CD mounted in said CD-ROM drive with said multimedia information which comprises at least one multimedia presentation segment from said media storage pursuant to said user selected presentation options.

8. A method according to claim 7 wherein said step of verifying comprises:

transmitting control messages to said first computing device to activate said first computing device to retrieve data from said CD mounted in said CD-ROM drive; and determining, in response to receipt of said retrieved data from said first computing device, whether said CD is mounted in said CD-ROM drive.

9. An interactive multimedia system, comprising a remote computing device that serves at least one user computing device which is connectable thereto via a communication medium, said at least one user computing device including a media drive which is capable of retrieving data from a readable single purpose medium mounted in said media drive and a display device, said system comprising:

means, responsive to receipt of a request by a user of said user computing device via said communication medium, for producing a multimedia presentation;

means for verifying on said user computing device that said user has mounted a designated single purpose medium in said media drive;

means for retrieving data from said single purpose medium in a manner defined by said user selecting from a plurality of presentation options;

means for dynamically generating a customized presentation on said remote computing device using said retrieved data from said single purpose medium and data stored on said remote computing device;

means for transmitting said customized presentation from said remote computing device to said user computing device; and means for simultaneously executing said customized presentation with data from said single purpose medium on said user computing device.

10. An interactive multimedia system according to claim 9 wherein said remote computing device includes:

server means for processing said data retrieved from said readable single purpose medium pursuant to said user selected presentation options;

interface means for providing direct access to and from said communication medium; and media storage means for storing data representative of single purpose medium information which comprises at least one multimedia presentation segment.

11. An interactive multimedia system according to claim 10 wherein said communication medium comprises the Internet, said interactive multimedia system further comprising:

means for presenting a Web page to a user connected to said remote computing device via said interface means.

12. An interactive multimedia system according to claim 10 wherein said means for dynamically generating includes:

media processing means for integrating said data retrieved from said readable single purpose medium with said at least one multimedia presentation segment from said media storage means pursuant to said user selected presentation options.

13. An interactive multimedia system according to claim 9 wherein said means for verifying includes:

means for transmitting control messages to said user computing device to activate said user computing device to retrieve data from said readable single purpose medium mounted in said media drive; and means, responsive to receipt of said retrieved data from said user computing device, for determining whether an authorized one of said readable single purpose medium is mounted in said media drive.

14. A method for providing an interactive multimedia service on a remote computing device, that serves at least one user computing device which is connectable thereto via a communication medium, said user computing device including a media drive capable of retrieving data from a readable medium mounted in said media drive and a display device, said method for providing an interactive multimedia service, executing on a remote computing device comprising:

producing a multimedia presentation, in response to receipt of a request by a user of said user computing device via said communication medium;

verifying on said user computing device that said user has mounted an authorized readable medium in said media drive;

retrieving data from said authorized readable medium mounted in said media drive in a manner defined by said user selecting from a plurality of presentation options;

dynamically generating a user customized presentation on said remote computing device using said retrieved data from said authorized readable medium and data stored on said remote computing device;

transmitting said user customized presentation from said remote computing device to said user computing device; and simultaneously executing said user customized presentation with retrieved data from said authorized readable medium on said user computing device.

15. A method according to claim 14 wherein said remote computing device comprises a server for processing information from said authorized readable medium pursuant to said user selected presentation options, an interface for providing direct access to and from said communication medium, and a media storage for storing data representative of said information which comprises at least one multimedia presentation segment, said step of dynamically generating includes:

integrating said information from said authorized readable medium mounted in said media drive with said at least one multimedia presentation segment from said media storage means pursuant to said user selected presentation options.

16. A method according to claim 14 wherein said step of verifying includes:

transmitting control messages to said user computing device to activate said user computing device to retrieve data from said authorized readable medium mounted in said media drive; and determining, in response to receipt of said retrieved data from said user computing device, whether said authorized readable medium is mounted in said media drive.

17. An interactive multimedia system for providing a real time multimedia presentation to a user located at a user computing device having a network communication interface, a processor, a display, and a media drive compatible with a single purpose recorded medium, said interactive multimedia system comprising:

a multimedia server having a network communication interface, a processor, a memory, and multimedia data stored in said memory;

a network communication path that is accessible to said user computing device by said network communication interface located in said user computing device and said multimedia server by said network communication interlace located in said multimedia server;

means for contacting said multimedia server from said user computing device by way of said network communication path;

means for restricting access to said multimedia server from said user computing device based on a security key verification of said single purpose recorded medium;and means, in response to a positive security key verification, for combining contents of said single purpose recorded medium with said multimedia data into a user designed real time multimedia presentation and simultaneously controlling production of said real time multimedia presentation.

18. An interactive multimedia system according to claim 17 wherein:

said single purpose recorded medium is a Redbook format compact disk; and said multimedia data is a user programmable visual component of said multimedia presentation.

* * * * *